United States Patent

Jarema

Patent Number: 5,993,561
Date of Patent: Nov. 30, 1999

[54] PROCESS FOR CLEANING PAINT RESIDUES FROM SURFACES

[75] Inventor: Chester P. Jarema, Sterling Heights, Mich.

[73] Assignee: Henkel Corp., Gulph Mills, Pa.

[21] Appl. No.: 09/000,086

[22] PCT Filed: Jul. 15, 1996

[86] PCT No.: PCT/US96/11433

§ 371 Date: Jan. 27, 1998

§ 102(e) Date: Jan. 27, 1998

[87] PCT Pub. No.: WO97/04889

PCT Pub. Date: Feb. 13, 1997

Related U.S. Application Data

[60] Provisional application No. 60/001,584, Jul. 27, 1995.

[51] Int. Cl.$^6$ .............................. B08B 3/08; B08B 9/00
[52] U.S. Cl. .................. 134/7; 134/8; 134/22.1; 134/22.11; 134/27.12; 134/22.13; 134/22.14; 134/22.16; 134/22.17; 134/22.18; 134/22.19; 134/26; 134/34; 134/36; 134/38
[58] Field of Search ............... 134/7, 8, 38, 22.1, 134/22.11, 22.12, 22.13, 22.14, 22.16, 22.17, 22.18, 22.19, 26, 34, 36

[56] References Cited

U.S. PATENT DOCUMENTS

| | | | |
|---|---|---|---|
| 4,968,447 | 11/1990 | Dixon et al. | 134/6 |
| 5,290,364 | 3/1994 | Stein et al. | 134/7 |
| 5,423,919 | 6/1995 | Dieter et al. | 134/8 |
| 5,443,748 | 8/1995 | Bergishagen et al. | 252/DIG. 8 |
| 5,505,749 | 4/1996 | Kirschner et al. | 134/6 |

*Primary Examiner*—Zeinab El-Arini
*Attorney, Agent, or Firm*—Ernest G. Szoke; Wayne C. Jaeschke; Norvell E. Wisdom

[57] ABSTRACT

A process for removing dried paint residues from a difficultly accessible surface is provided. The surface is contacted with a slurry of particulate solids such as sodium hydrogen carbonate in a first liquid such as N-methyl pyrrolidone which is a solvent or swellant for the paint residues, followed by a different liquid such as isopropyl alcohol in which the first liquid is soluble (and which may also optionally contain particulate solids). The surface is then further contacted with yet another liquid such as water in which both the second liquid used and the particulate solids are soluble

23 Claims, 1 Drawing Sheet

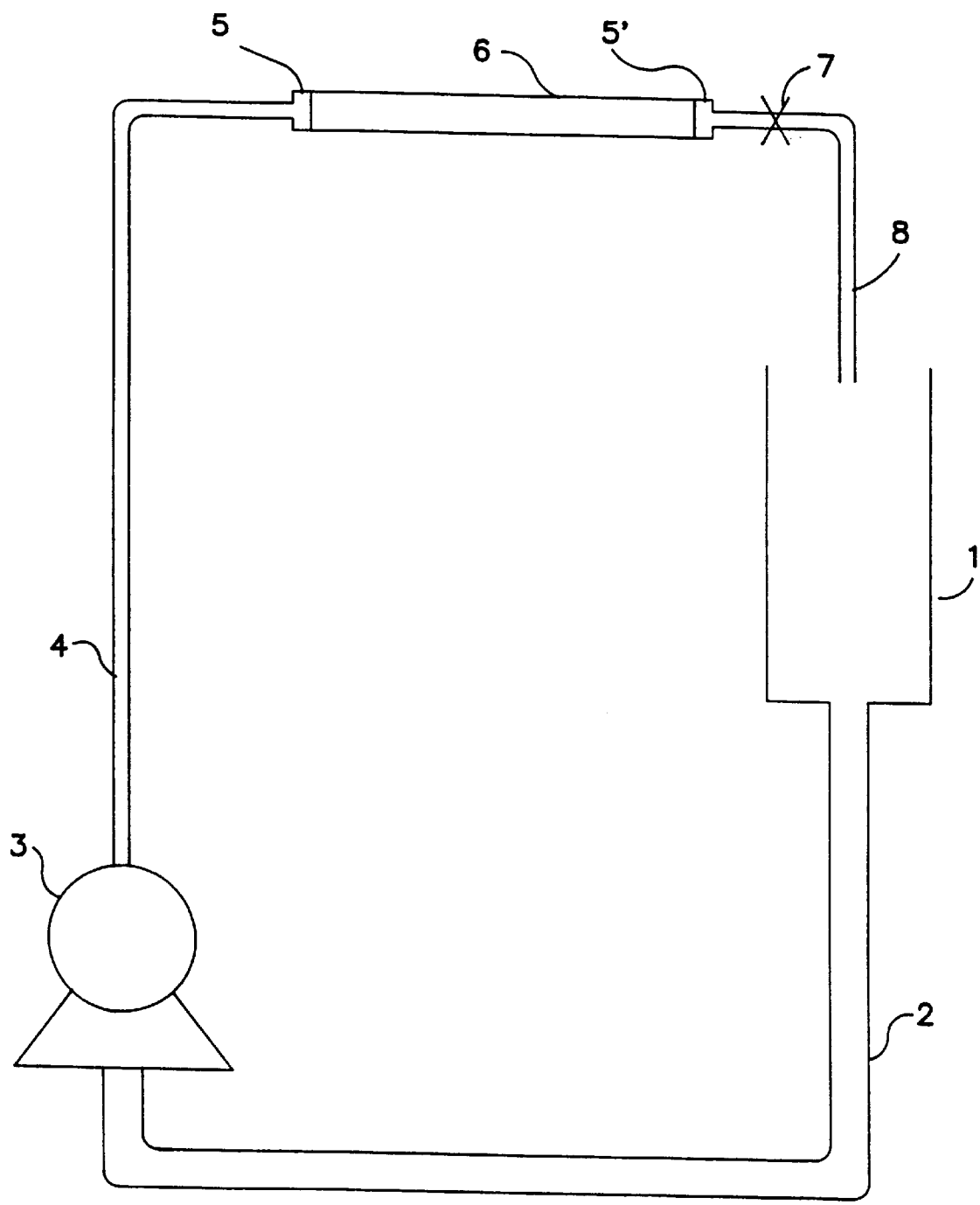

PROCESS FOR CLEANING PAINT RESIDUES FROM SURFACES

This application claims the benefit of U.S. provisional application 60/001,584, filed Jul. 27, 1995, and also is a national stage application of PCT/US96/11433 filed Jul. 15, 1996.

BACKGROUND OF THE INVENTION

1. Field of the Invention

This invention relates to an improvement in processes for cleaning totally or partially dried residues of paints and like materials from surfaces, particularly surfaces that are not readily accessible to access by conventional cleaning tools such as scrapers, abrasive bodies, and the like. More particularly, this invention relates to cleaning of pipework and similar structures that convey liquid paints and like materials to apparatus by which the paint is applied to form a protective and decorative coating on manufactured objects such as automobile bodies and appliance cabinets. Normally in such manufacturing operations, at least the color and sometimes more fundamental characteristics of the protective and decorative coatings applied from the same apparatus are varied from time to time.

Whenever such a change is made, it is necessary to clean the liquid paint conveying structures in order to prevent inconsistent product appearances resulting from contamination of one type of paint by another. Cleaning would be relatively easy if it could be assured that any unused protective coating forming liquid product would remain liquid in all parts of the conveying apparatus throughout all uses of the apparatus, including changing from one color or type of protective coating to another. However, as is well known to those skilled in the art, such a condition rarely if ever is observed in practice, and it is therefore necessary to have a process of cleaning that can satisfactorily clean surfaces on which protective coating forming liquids have been partially or totally dried. This general field will be denoted briefly hereinafter as "paint line cleaning", but it is to be understood that the invention applies to cleaning any type of surface on which an unwanted and at least partially solid coating has formed as a result of contact with a liquid composition intended to form a protective solid coating on other surfaces.

2. Discussion of Related Art

Traditionally, paint line cleaning has been accomplished primarily by contacting an at least partially solid coating to be removed with a liquid solvent or swelling agent for the solid protective coating. Such a process is fully satisfactory only in the relatively few cases in which the protective coating is readily soluble in some reasonably priced solvent. Some highly effective and frequently used protective coatings, however, are chemically cross-linked to varying degrees, and usually no true solvent at all is known for densely cross-linked solids. Organic solids of the types used for most paints or like protective coatings, whether crosslinked or not and even if insoluble in any known liquid, can usually be swollen by some liquids, despite their lack of true solubility, and the swollen solids are mechanically weaker and therefore more readily removable by mechanical action. However, obtaining effective mechanical action in the interior of a long narrow pipe remains a difficult problem. One previously attempted solution is to incorporate conventional abrasive particles into a slurry in a suitable swellant/solvent for the dried paint residues to be removed and then pump this slurry through the pipe to be cleaned. This method does improve the removal of paint but introduces a new problem: Conventional abrasive particles themselves are difficult to remove completely from a paint line, and they are extremely undesirable contaminants in liquid coating forming compositions intended to produce most decorative surfaces, because they often cause readily visible surface irregularities even when relatively small.

DESCRIPTION OF THE INVENTION

Objects of the Invention

A major object of the invention is to provide an improved process for cleaning at least partially dried paint residues from metallic surfaces to which they are adherent, a process which will eliminate or at least reduce the above noted deficiencies of prior art procedures, especially in paint line cleaning. Another concurrent or alternative object is to provide a novel slurry of water soluble particulate solids in a nonaqueous liquid that is effective for swelling and/or dissolving paint residues. Other objects will be apparent from the description below.

General Principles of Description

Except in the claims and the specific examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the term "polymer" includes "oligomer", "copolymer", "terpolymer", and the like; the first definition or description of the meaning of a word, phrase, acronym, abbreviation or the like applies to all subsequent uses of the same word, phrase, acronym, abbreviation or the like and applies, *mutatis mutandis*, to normal grammatical variations thereof; the description of a group or class of materials as suitable or preferred for a given purpose in connection with the invention implies that mixtures of any two or more of the members of the group or class are equally suitable or preferred; specification of materials in ionic form implies the presence of sufficient counterions to produce electrical neutrality for the composition as a whole; and any counterions thus implicitly specified preferably are selected from among other constituents explicitly specified in ionic form, to the extent possible; otherwise such counterions may be freely selected, except for avoiding counterions that act adversely to the objects of the invention.

SUMMARY OF THE INVENTION

It has been discovered that suspended solid particles other than conventional abrasives are also effective in assisting the removal of paint residues from metal surfaces to which they adhere. This permits a substantial improvement in the reliability and/or the speed of elimination of all contamination from paint lines and other surfaces bearing residues of paint to be removed, by selecting a solid that is substantially insoluble in a suitable swellant/solvent liquid composition used to remove paint residues but is readily soluble in a second liquid that can be pumped through the paint line, or otherwise contacted with some other type of surface cleaned from paint residues formerly present thereon, after at least most of the first swellant/solvent liquid has been removed from contact with the cleaned surface.

A process according to the invention correspondingly comprises, or preferably consists essentially of, removing at least partially dried paint residues from a surface bearing a coating of such paint residues by steps of:

(I) providing a first liquid that is a swellant/solvent for the paint residues to be removed, a second liquid that is chemically distinct from the first liquid, and particulate solids that are substantially insoluble in the first liquid but substantially soluble in the second liquid;

(II) forming a slurry of the particulate solids in the first liquid;

(III) causing the slurry formed in step (II) to move in turbulent flow and to contact the surface bearing a coating of paint residues to be removed while the slurry is moving in turbulent flow, contact between the slurry moving in turbulent flow and the surface bearing a coating of paint residues to be removed being maintained until a desired degree of removal of paint residues from the surface bearing a coating of paint residues to be removed has been achieved, so that the former surface bearing a coating of paint residues to be removed has been changed to a cleaned surface;

(IV) after step (III), discontinuing contact between the cleaned surface and the slury of the particulate solid in the first liquid; and (V) after step (IV), contacting the cleaned surface with the second liquid in a sufficient volume having sufficiently rapid motion for a sufficient time to remove any residue of the particulate solids from the cleaned surface by dissolving the residue of the particulate solids in the second liquid.

A suspension according to the invention comprises, preferably consists essentially of, or more preferably consists of, a dispersed particulate solid phase and a continuous liquid phase, the particulate solid being substantially insoluble in the continuous liquid phase but substantially soluble in water.

BRIEF DESCRIPTION OF THE INVENTION

FIG. 1, the sole drawing figure, is a schematic diagram of laboratory apparatus used to test and demonstrate the operation of the invention.

DETAILED DESCRIPTION OF THE INVENTION, INCLUDING PREFERRED EMBODIMENTS

Whenever herein any liquid or solid material is described as "substantially insoluble" in a chemically distinct liquid material, the solubility at 25° C. of the first mentioned liquid or solid material in the chemically distinct liquid material preferably is, with increasing preference in the order given, not more than 10, 5, 2, 1, 0.5, 0.3, 0.2, 0.1, 0.05, 0.03, 0.02, 0.01, 0.005, 0.003, 0.002, 0.001, 0.0005, 0.0003, or 0.0002 grams per liter (hereinafter usually abbreviated as "g/L") of the chemically distinct liquid material; and, independently, whenever herein any liquid or solid material is described as "substantially soluble" in a chemically distinct liquid material, the solubility at 25° C. of the first mentioned liquid or solid material in the chemically distinct liquid material preferably is, with increasing preference in the order given, at least 15, 20, 25, 30, 35, 40, 45, 50, 55, 60, 65, 70, 75, 80, 85, 90, 95, or 100 g/L.

An optional and often preferred process step that may be used without changing the essential character of the invention is contacting the cleaned surface formed in step (IV) with a third liquid having the properties that (i) the first liquid is substantially soluble in it and (ii) the third liquid is substantially soluble in the second liquid, this contacting occurring before step (V) as described above. Inasmuch as the first liquid often is not substantially soluble in the second liquid, such use of a third intermediate liquid guards against the danger that would otherwise exist of some pockets of first liquid being retained in crevices or other irregularities of the cleaned surface. Such retention is particularly likely in complex pipework involving many bends, distributors, variations in diameter over a relatively short distance, and/or the like often found in practical use where complex shaped objects are to be painted. If necessary or desired, still more additional intermediate liquids could be used, but this has not been found advantageous normally. The third liquid when used can and often preferably does also contain some particulate solid to aid in further removal of paint residues.

For convenience and economy, it is normally preferred that most or all of the second liquid as described above consist of water. It is normally preferred, if the fastest possible cleaning of paint residues is desired, that the first liquid as described above consist of the same liquid chemical substance(s) as are normally used now in paint line cleaning for removing the same type of paint residues as are to be removed in a process according to this invention. However, where economy of material consumption is more important than speed, it is possible with this invention to use somewhat inferior swellant/solvent liquids that might not remove paint at a practically useful rate in the absence of dispersed solids; such swellant/solvent liquids are often substantially less expensive than the swellant/solvent liquids normally used in the absence of any dispersed solids as described herein.

For most types of conventional paints and like materials, the residues from which are to be removed from metallic or other hard surfaces, the first liquid preferably comprises, with increasing preference in the order given, at least 35, 45, 50, 55, 60, or 65% of materials selected from the group consisting of aromatic and terpene hydrocarbons, esters, alcohols, ketones, amides, halocarbons, and halohydrocarbons. More preferably, these materials are selected from the group consisting of: (i) aromatic and terpene hydrocarbons; (ii) lactams containing at least five carbon atoms, (iii) ether alcohols, and (iv) halocarbons and halohydrocarbons containing at least two halogen atoms per molecule. Still more preferably, any ether alcohols used contain no more than 10 carbon atoms and one hydroxyl group per molecule, and, independently, any halohydrocarbons used contain not more than, with increasing preference in the order given, 6, 5, 4, 3, 2, or 1 carbon atom(s) and at least two atoms selected from the group consisting of chlorine and fluorine.

For removing most types of conventional paints and like materials, a combination of aromatic hydrocarbons and lactams containing at least five carbon atoms is preferred for the first liquid even more than either of these components of the combination alone. The ratio of the amount of lactam to the amount of aromatic hydrocarbon preferably is at least, with increasing preference in the order given, 1.0:1.0, 1.5:1.0, 1.8:1.0, 2.1:1.0, 2.4:1.0, or 2.6:1.0 and independently preferably is not more than, with increasing preference in the order given, 10: 1.0, 8:1.0, 6:1.0, 4.0:1.0, 3.5:1.0, 2.9:1.0, or 2.7:1.0.

When these preferred first and second liquids are used, a third intermediate liquid as described above is preferably used and when used is preferably selected from the group consisting of alcohols, ketones, and aldehydes, all independently preferably having a ratio of the number of carbon atoms in each molecule to the number of oxygen atoms in a hydroxy, ketone, or aldehyde moiety in each molecule that is not more than 4, or more preferably not more than 3. The single most preferred third liquid is isopropyl alcohol.

The particulate solids required according to this invention may be selected from a wide variety of chemical substances, as long as the solubility criteria specified herein are satisfied and the substance(s) used have no adverse effect on the properties of the cleaned surface. For example, alkali metal and ammonium borates, carbonates, chlorides, chlorates, nitrates, phosphates (including condensed phosphates), silicates, and sulfates, all including partially hydrogen retaining anions and solid hydrates where chemically possible, along with most other inorganic nitrates and most metal acetates and formates, and even some highly polar purely organic neutral compounds such as sugar, are suitable particulate solids for use with most types of first liquids when water is the second liquid in a process according to the invention. Generally, the basis of preferences among these materials is economic: whatever material with suitable solubility characteristics is available in desirable particle size grades at a low price would normally be preferred for the particulate solids. Sodium hydrogen carbonate has been found to be readily available in a preferred size grade and very well suited to use as the particulate solids according to this invention.

There are no narrow limitations on the size of the particles in the particulate solid required according to this invention. However, it is preferred that the particle size be small enough that most of the particles can be readily suspended in the moving slurry of the particulate solid in the first liquid that is required in part of a process according to this invention, but also large enough to transfer a useful amount of momentum to the surface bearing a coating of paint residues to be removed when the suspended solid particles collide with paint residues to be removed. For materials with the density of sodium hydrogen carbonate (i.e., 2.2 grams per cubic centimeter), the preferred particle sizes are small enough that they may conveniently be measured by sieving. Specifically, it is preferred that for any representative sample of the particulate solid, not more than, with increasing preference in the order given, 10, 8, 6, 4, 3, 2.0, or 1.5% of the sample be retained on a standard 35 mesh screen (this and all other mesh sizes stated herein being according to U.S. standards) and independently preferred that not more than, with increasing preference in the order given, 10, 8, 6, 4, 3, 2.0, or 1.5% of the sample pass through a 200 mesh screen. Independently, it is preferable that at least, with increasing preference in the order given, 10, 20, 25, 30, 33, 36, or 39% of the particulate solid be retained on a 50 mesh screen but independently that no more than, with increasing preference in the order given, 70, 60, 50, 47, 45, 43, or 41% of the particulate solid be retained on a 50 mesh screen. Also, independently, it is preferred that at least, with increasing preference in the order given, 70, 75, 80, 85, 90, 92, 94, 95, 96, or 97% of the particulate solid be retained on a 100 mesh screen.

There are no narrow limits on the proportion between the particulate solid and the amount of the first liquid or third liquid in which the particulate solid is slurried during a process according to this invention. However, there are preferable values, because too little of the particulate solid will make any benefit of the invention difficult to detect, while too much of the particulate solid will increase the effective viscosity of the slurry and thereby reduce the turbulence for a constant speed of motion of the slurry. For a particulate solid with the density of sodium hydrogen carbonate, the concentration of particulate solid per unit volume of first (or third) liquid as described above preferably is, with increasing preference in the order given, at least 5, 10, 15, 20, or 22 g/L of liquid and independently preferably is, with increasing preference in the order given, not more than 300, 150, 100, 80, 65, 50, 45, 42, 40, or 38 g/L. If the density of the particulate solid is substantially different from that of sodium hydrogen carbonate, the values given above should be adjusted to result in the same volume percent of particulate solids to liquid in which the particulate solids are slurried as would result from the above specified concentrations for sodium hydrogen carbonate.

Independently of other preferences, in order to promote facile suspension of the particulate solids in the first (or third) liquid as described above, the difference in density between the particulate solids and the liquid in which they are slurried preferably should not be greater than, with increasing preference in the order given, 5, 4, 3.5, 3.0, 2.8, 2.6, 2.4, 2.2, 2.0, 1.8, 1.6, 1.4, 1.2, 1.0, 0.8, 0.6, 0.4, or 0.2 g/L.

In order to obtain substantial advantages from the use of this invention, the particulate solids suspended in the first liquid must be propelled with substantial force against the paint residues on a surface bearing a coating of paint residues to be removed. This is most readily accomplished by moving the suspension of the particulate solids in the first liquid rapidly enough to maintain turbulent flow. The degree of turbulence is commonly measured by a "Reynolds number", $N_{Re}$, defined by the following equation: $N_{Re} = L \cdot V \cdot \rho / \mu$, where L represents a characteristic linear dimension, which for flow in a circular pipe is the diameter of the pipe and for other kinds of flow can be determined as known in the art; V represents the fluid flow velocity; $\rho$ represents the density of the fluid, and $\mu$ represents the viscosity of the fluid. All these parameters except $N_{Re}$ itself should be expressed in mutually consistent dimensions, so that $N_{Re}$ is dimensionless. With increasing preference in the order given, motion of the suspension of particulate solids in the first liquid during step (III) of a process according to this invention as defined above, and in any intermediate liquid in which particulate solids are suspended, is sufficiently rapid that the corresponding Reynolds number is at least, with increasing preference in the order given, 2000, 3000, 5000, 7000, 9000, 11,000, 13,000, 15,000, 17,000, 18,000, 19,000, or 20,000.

For the sake of economy and other practical benefits, a process according to the invention nonlally is conducted within a container in which rapidly moving liquids and slurries of solids in liquids can be brought into contact with the paint residues to be removed, without loss of such liquids and slurries through or over the walls of the container. For the most preferred use, paint line cleaning, the paint line itself serves as such a container. If the surface bearing a coating of paint residues to be removed is not itself part of an interior wall of a container, a separate container into which the surface bearing a coating of paint residues to be removed will fit and can be covered completely with moving liquids and slurries of solids in liquids, without loss of such liquids and slurries through or over the walls of the container, is normally preferred and can be readily accomplished by means known in the art.

The invention and its benefits may be further appreciated from consideration of the following working examples and comparison examples.

Test Apparatus

The test apparatus used in most of the examples and comparison examples is shown schematically in FIG. 1, the sole drawing figure, wherein reference number 1 indicates an open-top reservoir in which a liquid or suspension can be stored when not in use, and from which a pump inlet pipe 2 leads to a pump 3. When powered by conventional means not shown, the pump discharges fluid through pump outlet tube 4, which is connected to test section 6 via conventional tubing to pipe couplings 5 and 5'. When in use, fluid flows from the test section 6 through reservoir delivery tube 8 back to reservoir 1, which is open at the top but has sufficiently high walls to contain the volume of liquid in the apparatus. Valve 7 enables control of flow. Reservoir 1 and pipe 2 are constructed from galvanized steel pipe, with a diameter of about 10 centimeters for the main body of the reservoir and about 19 mm for pipe 2, with a conventional reducer between them. The pump acts as a valve when not powered, so that fluid can be added to the reservoir without being lost, and the height of the reservoir above the pump inlet helps prime the pump when the pump is turned on. Tubes 4 and 8 are all constructed of stainless steel tubing with a diameter of about 1 centimeter, while test section 6 was normally constructed of cylindrical glass pipe with an inside diameter of 1.6 centimeters.

General Test Method

In use, the liquid or slurry to be evaluated was placed in reservoir 1 of the test apparatus. A glass tube with paint residues pre-dried thereon was placed in the apparatus as test section 6. Pump 3 was turned on, so as to cause a flow of the tested liquid or slurry from the bottom of the reservoir through the test section and back to the top of the reservoir, at a rate of 19 liters per minute, corresponding to a Reynolds number of about 25,000 in test section 6 when the liquid pumped through is water and the amount of solids present is not so large that it substantially increases the density or viscosity of the suspension compared to that of the liquid continuous phase of the suspension.

The paint residues to be tested were put into place on the inside of a glass pipe test section by stoppering one end of the test section, filling the stoppered pipe with paint, inverting it and allowing the paint to drain, and then drying the residue that remained on the walls by exposure to ambient air for at least four days.

Specific Tests—Group 1

1.1. A test section was coated with Du Pont water-borne base coat 521R95047. The coated test section was put into place in the apparatus as described above and the reservoir initially loaded with P3® Paint Line Cleaner 118, commercially supplied by the Parker Amchem Division of Henkel Corp., Madison Heights, Mich. USA. P3® Paint Line Cleaner 118 is a conventional high quality paint line cleaner in which the two major ingredients are N-methyl pyrrolidone and light aromatic naptha petroleum distillate. The liquid paint line cleaner was then circulated for 15 minutes without completely cleaning the tube.

After this time, a sufficient amount of Armax™ Maintenance XL Formula particulate sodium hydrogen carbonate, commercially supplied by Church & Dwight, to provide a concentration of 30 g/L of particulate solids in the volume of liquid in the apparatus was added. The supply of sodium hydrogen carbonate used had a particle size distribution determined by sieving as shown in Table 1 below. After addition of the particulate sodium hydrogen carbonate solids, pumping was continued, and substantial additional paint removal was achieved.

The slurry was then removed from the apparatus and the parts of the apparatus cleaned and blown dry with air. Isopropyl alcohol (hereinafter usually abbreviated as "IPA") was then substituted for the cleaning slurry in the residue and circulated through the system for 5 minutes. This in turn was then drained and replaced by tap water, with an initial pH value of 7.45. After the first volume of water had circulated for 5 minutes, its pH value had risen to 8.89, indicative of the water having dissolved some residual sodium hydrogen carbonate. The water was then drained from the system, and a second increment of water of the same size as the first was added and again circulated by the

TABLE 1

| Screen Mesh Size | Percent Retained on Screen | Percent Passing Through Screen |
| --- | --- | --- |
| 6 | 0.00 | 100.00 |
| 8 | 0.00 | 100.00 |
| 14 | 0.00 | 100.00 |
| 25 | 0.00 | 100.00 |
| 35 | 1.30 | 98.70 |
| 50 | 39.02 | 60.98 |
| 100 | 57.46 | 3.52 |
| 150 | 1.52 | 2.25 |
| 200 | 0.95 | 1.30 |
| 325 | 0.67 | 0.63 |
| Pan | 0.63 | — |

The four liquid charges to the apparatus were also examined. The first looked like somewhat thinned paint, except for a noticeable amount of retained particulate solids. The second liquid (IPA) was substantially clear and transparent in its liquid portions, but had dispersed, readily settling, grey residue, believed to be derived from the paint residues, and some dispersed sodium hydrogen carbonate. The third liquid charge, originally tap water, was slightly cloudy with grey residue, while the fourth liquid charge, the second increment of tap water, was almost completely clear.

1.2. This test was performed in the same manner as 1.1, except that: (i) the initial period of circulation with liquid paint line cleaner only was 45 minutes; (ii) when this paint line cleaner was removed, it was replaced with sodium hydrogen carbonate and IPA, not with more paint line cleaner, and the concentration of particulate solids was 38 g/L; the dispersion in IPA was circulated for 40 minutes total, with rotation of the test section after the first 25 minutes; the initial liquid had no suspended sodium hydrogen carbonate (because none had been present in it); the IPA had considerably more suspended sodium hydrogen carbonate; the first increment of water had a pH of 8.43 after 15 minutes circulation, and the second increment of water had a pH of 7.9 after 15 minutes circulation.

1.3. This test was the same as 1.1,except that: the initial period of circulation of the 118 Paint Line Cleaner was only 5 minutes, and substantially none of the tube surface was cleared of all paint residues; the amount of sodium hydrogen carbonate particulate solids added gave a concentration of 38 g/L in suspension, and after the first five minutes of use of this slurry, there was considerably more evidence of paint removal than without the particulate solids in the same time; the circulation of the slurry was continued for 7.7 hours, with the test section rotated after 2 hours, rotated again after another 1 hour, additional particulate sodium hydrogen carbonate solids, sufficient to give a concentration of 76 g/L, added and the test section rotated again after 2 more hours, and the test section rotated again after 1 more hour; and the tube was completely cleaned except for narrow streaks near the ends and in a center section that appeared to have low turbulence, judged by visual examination of the flow after most of the wall of the test section had become clear enough to allow observation through the walls of the motion of the suspended solids.

1.4. (Comparative example only) This was substantially the same as 1.1, except that: No particulate solids and no other liquids than the 118 Paint Cleaner were ever added; the test section was rotated after two hours; and the degree of removal was about 40% after one hour, 50% after 3 hours, and 70% after 5 hours total; however, all portions of the test section retained at least spotty paint residues, with no large area of the test section completely clean, as had been achieved in a shorter time with the use of suspended solids.

Group 2

In the same general manner as described for Group 1, the following particulate solids are used: ammonium borate, ammonium carbonate, ammonium sulfate and hydrogen sulfate, potassium borates and hydrogen borates, potassium carbonate and hydrogen carbonate, potassium nitrate, potassium orthophosphate and hydrogen orthophosphates, potassium silicates and hydrogen silicates, potassium sulfate and hydrogen sulfate, sodium borates and hydrogen borates, sodium carbonate and hydrogen carbonate, sodium nitrate, sodium orthophosphate and hydrogen orthophosphates, sodium silicates and hydrogen silicates, and sodium sulfate and hydrogen sulfate.

The invention claimed is:

1. A process for removing at least partially dried paint residues from a surface bearing a coat of such paint residues, said process comprising the steps of
   (I) providing (a) a first liquid that is swellant/solvent for the paint residues to be removed, (b) a second liquid that is chemically distinct from the first liquid, (c) a third liquid that is chemically distinct from both said first and said second liquids and is substantially soluble in said second liquid, wherein said first liquid is substantially soluble in said third liquid, and (d) particulate solids that are substantially insoluble in the first liquid but substantially soluble in the second liquid;
   (II) forming a slurry of the particulate solids in the first liquid;
   (III) causing the slurry formed in step (II) to move in turbulent flow and to contact the surface bearing a coating of paint residues to be removed while the slurry is moving in turbulent flow, contact between the slurry moving in turbulent flow and the surface bearing a coating of paint residues to be removed being maintained until a desired degree of removal of paint residues from the surface bearing a coating of paint residues to be removed has been achieved, so that the surface bearing a coating of paint residues to be removed has been changed to at least partially cleaned surface;
   (IV) after step (III), discontinuing contact between the at least partially cleaned surface and the slurry of the particulate solids in the first liquid,
   (V) after step (IV), contacting the at least partially cleaned surface with the third liquid;
   (VI) after step (V), discontinuing contact between the at least partially cleaned surface and said third liquid; and
   VII) after step (VI), contacting the at least partially cleaned surface with the second liquid in a sufficient volume having sufficiently rapid motion for a sufficient time to remove any residue of the particulate solids from the at least partially cleaned surface by dissolving such residue of the particulate solids in the second liquid.

2. The process of claim 1 wherein the second liquid consists essentially of water.

3. The process of claim 1 wherein at least 35% of the first liquid is selected from the group consisting of aromatic and terpene hydrocarbons, esters, alcohols, ketones, amides, halocarbons and halohydrocarbons.

4. The process of claim 1 wherein the third liquid comprises one or more substances selected from the group consisting of alcohols, ketones and aldehydes.

5. The process of claim 1 wherein the turbulent flow of the slurry of particulate solids in the first liquid during step(III) corresponds to a Reynolds number of at least about 3000.

6. The process of claim 1 wherein the particulate solids provided in step (I) have particle sizes such that not more than about 10% of a representative sample of the particulate solids will be retained on a 35 mesh screen, not more than about 10% of said sample will pass through a 200 mesh screen, from about 10 to about 70% of said sample will be retained on a 50 mesh screen, and at least about 70% of said sample will be retained on a 100 mesh screen.

7. The process of claim 1 wherein the slurry contacted during step (III) with the surface to be cleaned contains a volume percent of particulate solids within a range corresponding to from 5 to 150 g/L of sodium hydrogen carbonate in the first liquid.

8. The process of claim 1 wherein the particulate solids and the first liquid are no more than about 3.5 g/L different in density.

9. The process of claim 1 wherein substantially insoluble solids are suspended in the third liquid used in step (V), said substantially insoluble solids being substantially soluble in the second liquid.

10. The process of claim 1 wherein the particulate solids are selected from the group consisting of alkali metal borates, ammonium borates, alkali metal carbonates, ammonium carbonates, alkali metal chlorides, ammonium chlorides, alkali metal chlorates, ammonium chlorates, inorganic nitrates, alkali metal phosphates, ammonium phosphates, alkali metal silicates, ammonium silicates, alkali metal sulfates, ammonium sulfates, and highly polar purely organic neutral compounds.

11. The process of claim 1 wherein the particulate solids are sodium hydrogen carbonate.

12. A process of removing at least partially dried paint residues from a surface bearing a coating of such paint residues, said process comprising the steps of:
   (I) providing
      (a) a first liquid that is a swellant/solvent for the paint residues to be removed, at least 35% of said first liquid being selected from the group consisting of aromatic and terpene hydrocarbons, esters, alcohols, ketones, amides, halocarbons and halohydrocarbons;
      (b) a second liquid that is chemically distinct from the first liquid, wherein said second liquid is predominantly water;
      (c) a third liquid that is chemically distinct from both said first and second liquids, is substantially soluble in said second liquid, and is comprised of one or more substances selected from the group consisting of alcohols, ketones and aldehydes, wherein said first liquid is substantially soluble in said third liquid; and
      (d) particulate solids that are substantially insoluble in the first liquid but substantially soluble in the second liquid and have particle sizes such that not more that about 10% of a representative sample of the particulate solids will be retained on a 35 mesh screen, not more than about 10% of said sample will pass through a 200 mesh screen, from about 10 to about 70% of said sample will be retained on a 50 mesh screen, and at least about 70% of said sample will be retained on a 100 mesh screen;
   (II) forming a slurry of the particulate solids in the first liquid which contains a volume percent of particulate solids within a range corresponding to from 5 to 150 g/L of sodium hydrogen carbonate in the first liquid;
   (III) causing the slurry formed in step (II) to move in turbulent flow corresponding to a Reynolds number of at least about 3000 and to contact the surface bearing a coating of paint residues to be removed while the slurry is moving in turbulent flow, contact between the slurry moving in the turbulent flow and the surface bearing a coating of paint residues to be removed being maintained until a desired degree of removal of paint residues from the surface bearing a coating of paint residues to be removed has been achieved, so that the surface bearing a coating of paint residues to be removed has been changed to an at least partially cleaned surface;

(IV) after step (III), discontinuing contact between the at least partially cleaned surface and the slurry of particulate solids in the first liquid;

(V) after step (IV), contacting the at least partially cleaned surface with the third liquid;

(VI) after step (V), discontinuing contact between the at least partially cleaned surface and said third liquid; and (VII) after step (VI), contacting the at least partially cleaned surface with the second liquid in a sufficient volume having sufficiently rapid motion for a sufficient time to remove any residue of the particulate solids from the at least partially cleaned surface by dissolving such residue of the particulate solids in the second liquid.

13. The process of claim 12 wherein at least 45% of the first liquid is selected from the group consisting of
   (i) aromatic and terpene hydrocarbons,
   (ii) lactams containing at least five carbon atoms per molecule,
   (iii) ether alcohols containing no more than ten carbon atoms per molecule, and
   (iv) halocarbons and halohydrocarbons containing at least two halogen atoms
   and not more than three carbon atoms per molecule.

14. The process of claim 12 wherein at least 60% of the first liquid is comprised of a combination of aromatic hydrocarbons and lactams containing at least five carbon atoms.

15. The process of claim 12 wherein the second liquid consists essentially of water.

16. The process of claim 12 wherein th third liquid is comprised of an alcohol having a ratio of carbon atoms to oxygen atoms of not more than 4.

17. The process of claim 12 wherein the particulate solids provided in step (I) have particle sizes such that not more than about 4% of a representative sample of the particulate solids will be retained on a 35 mesh screen, not more than about 4% of said sample will pass through a 200 mesh screen, from about 25 to about 50% of said sample will be retained on a 50 mesh screen, and at least 80% of said sample will be retained on a 100 mesh screen.

18. The process of claim 12 wherein the volume percent of particulate solids is within a range corresponding to from 15 to 65 g/L of sodium hydrogen carbonate in the first liquid.

19. The process of claim 12 wherein the particulate solids and the first liquid are no more than about 2.0 g/L different in density.

20. The process of claim 12 wherein the Reynolds number is at least about 13,000.

21. The process of claim 12 wherein substantially insoluble solids are suspended in the third liquid used in step (V), said substantially insoluble solids being substantially soluble in the second liquid.

22. The process of claim 12 wherein the particulate solids are selected from the group consisting of alkali metal borates ammonium borates, alkali metal carbonates, ammonium carbonates, alkali metal chlorides, ammonium chlorides, alkali metal chlorates, ammonium chlorates, inorganic nitrates, alkali metal phosphates, ammonium phosphates, alkali metal silicates, ammonium silicates, alkali metal sulfates, ammonium sulfates, and highly polar purely organic neutral compounds.

23. The process of claim 12 wherein the particulate solids are sodium hydrogen carbonate.

* * * * *